United States Patent [19]
Mohammed

[11] Patent Number: 5,894,479
[45] Date of Patent: Apr. 13, 1999

[54] PROVIDING ADDRESS RESOLUTION INFORMATION FOR SELF REGISTRATION OF CLIENTS ON POWER-UP OR DIAL-IN

[75] Inventor: Mannan Mohammed, Chandler, Ariz.

[73] Assignee: Intel Corporation, Santa Clara, Calif.

[21] Appl. No.: 08/763,613

[22] Filed: Dec. 10, 1996

[51] Int. Cl.$^6$ .................................................. H04J 3/02
[52] U.S. Cl. ........................... 370/401; 395/200.52
[58] Field of Search .................... 348/12, 13, 7, 348/6, 10; 395/200.5, 200.57, 200.58, 200.33, 200.51, 200.52; 370/420, 390, 404, 402, 401, 453

[56] References Cited

U.S. PATENT DOCUMENTS

| | | | |
|---|---|---|---|
| 5,534,913 | 7/1996 | Majeti et al. | 395/200.48 |
| 5,583,563 | 12/1996 | Wanderscheid et al. | 395/200.33 |
| 5,586,121 | 12/1996 | Moura et al. | 370/404 |
| 5,590,285 | 12/1996 | Krause et al. | 395/200.48 |
| 5,636,216 | 6/1997 | Fox et al. | 370/402 |

*Primary Examiner*—Chau Nguyen
*Assistant Examiner*—Kenneth Vanderpuye
*Attorney, Agent, or Firm*—Blakely, Sokoloff, Taylor & Zafman LLP

[57] ABSTRACT

In a system having a server and a client, the client having an upstream device capable of sending and receiving data from the server and a downstream device capable of receiving data from the server, and the server containing a set of network addresses and a set of hardware addresses, a method for forcing the server to send all downstream data to the client using the downstream device including the steps of: (1) establishing a connection between the server and the client using the upstream device; (2) constructing a start-up packet in the client; (3) transferring the start-up packet from the client to the server using a special port; and, (4) adding an entry for said client into the data structure in response to the start-up packet.

16 Claims, 6 Drawing Sheets

START-UP PACKET 112

| DESTINATION MAC ADDRESS | FF-FF-FF-FF-FF-FF |
|---|---|
| SOURCE MAC ADDRESS | 00-AA-00-11-22-33 |
| DESTINATION IP ADDRESS | 255.255.255.255 |
| SOURCE IP ADDRESS | 143.182.12.17 |
| DESTINATION PORT | 01D9 ← 473 (decimal) |
| SOURCE PORT | 0450 |
| PACKET DATA | 41,143,182,12,17, 00,AA,00,33,44,55 |

"ADD" command

FIG. 3

SHUT-DOWN PACKET 114

| DESTINATION MAC ADDRESS | FF-FF-FF-FF-FF-FF |
|---|---|
| SOURCE MAC ADDRESS | 00-AA-00-11-22-33 |
| DESTINATION IP ADDRESS | 255.255.255.255 |
| SOURCE IP ADDRESS | 143.182.12.17 |
| DESTINATION PORT | 01D9 |
| SOURCE PORT | 0450 |
| PACKET DATA | 42,143,182,12,17 |

"DELETE" command

FIG. 4

PROVIDING ADDRESS RESOLUTION INFORMATION FOR SELF REGISTRATION OF CLIENTS ON POWER-UP OR DIAL-IN

BACKGROUND OF THE INVENTION

1. Field of the Invention

The present invention relates to the field of establishing computer networks using cable modems. Specifically, the present invention allows a client communicating with a server using separate upstream and downstream devices to designate one or more devices as the devices to receive data from the server.

2. Description of Related Art

Currently, most home personal computers (clients) are connecting with the Internet and other on-line services using the public telephone network. Most often, data is transferred using Transmission Control Protocol/Internet Protocol (TCP/IP) implemented over such protocols as the Point-to-Point Protocol (PPP) or Serial Line IP (SLIP). PPP and SLIP allow clients to become part of a TCP/IP network (such as the internet) using the public telephone network and either an analog modem or an Integrated Services Digital Network (ISDN) device. Clients connect to a network by "dialing-up" a Point of Presence (POP) server, which then assigns the client an IP address.

The public telephone network has a switched point-to-point architecture and only offers relatively low bandwidth as it was originally designed for analog voice communication. Thus, it does not scale well to the delivery of broadband data such as multimedia. As a result, there are several efforts to create a broadband data delivery infrastructure for client applications. Such an infrastructure, when combined with the increasingly powerful clients that are now available, will enable the delivery of rich multimedia programming to the home.

Broadband data delivery may be accomplished over a variety of different delivery infrastructures. Of these, perhaps the most promising is the infrastructure currently used to deliver cable television. Recent advancements in radio frequency modulation and demodulation technology, along with a large base of cable television subscribers, has made cable television service providers a strong candidate for becoming the preferred provider of broadband services to the home. In the broadband network architecture, a client will be continuously connected to the broadband network and will be in communication with one or more servers at all times.

However, as the cable television network was originally intended only for transmitting "downstream" data from a "headend" server located at the cable television service provider's site to one or more subscribers/users (i.e., the network was designed for a one-to-many transmission of information), no provision was made for receiving data from the equipment (i.e., clients) located at the users' locations.

A solution has been proposed to achieve two-way communication of data using the existing cable television infrastructure. "Downstream data", defined to be data sent from a "headend server" to a client, is transferred over coaxial cable from the headend server into the home and to the user's client PC, while "upstream data", defined to be data sent from the client to the headend server, is transferred over the public telephone network. The asymmetrical allocation of upstream/downstream bandwidth is acceptable for most applications as the majority of users requires a larger downstream bandwidth compared to the upstream bandwidth (i.e., most users are "data consumers" rather than "data generators").

In operation, downstream data is received by a client using a "one-way" cable modem while upstream data is transmitted by an analog modem or an ISDN device, over the public telephone network, to the headend server via a Plain Old Telephone Service (POTS) server at the headend office. The POTS server forwards any upstream data sent by the client to the headend server for appropriate action (e.g., providing domain name server (DNS) services, simple mail transfer protocol (SMTP) services, gateway or proxy services, etc.).

The client, the POTS server, and the headend server communicate using TCP/IP. Data is transmitted in packets, where packets are defined as a block of data with appropriate transmission data attached in the form of a header and footer to be sent or received over a network. Downstream and upstream data are sent using the ethernet standard, as defined by the Institute of Electrical and Electronics Engineers (IEEE) 802.3, modulated for transmission over: (1) coaxial cable using the cable modem; or, (2) a telephone line using the analog modem or the ISDN device and PPP or SLIP protocols.

The cable modem and the analog modem/ISDN device will each have both an IP address and a media access control (MAC), "ethernet", address as the application layer uses IP addresses and the physical layer uses MAC addresses. MAC addresses are statically assigned to each device during manufacture, while IP addresses are dynamically assigned. To correlate MAC addresses to IP addresses, a look-up table conforming to the Address Resolution Protocol (ARP) is used by each machine to resolve the MAC address corresponding to an IP address.

An ARP table is updated periodically in response to conditions such as expiration/time-out of unused entries (i.e., a non-responsive machine) or the addition of a new machine. In the second situation, the ARP table is updated to contain a new entry to reflect the IP and MAC addresses of the new machine. For example, the headend server maintains its own ARP table for machines with which it communicates. When the headend server receives a packet from an "unknown" machine, the headend server will create a new ARP entry for that machine.

The problem with using separate devices for upstream and downstream data transfers is that the upstream device and the downstream device will both have a different IP address as there is the assignment of an IP address to the upstream device (i.e., the analog modem or ISDN device) in addition to the IP address already assigned to the cable modem. The problem involves the headend server, which, in response to data requests generated by the upstream device, will transfer downstream data to the upstream device. This is because the headend server will look-up the MAC address corresponding to the IP address of the requesting device in the ARP table and, finding that the MAC address belongs to the upstream device, the headend server will send the requested data to the upstream device as it is the IP address from which the request came.

For example, where the upstream device is an analog modem (dialing into a POTS server), and the downstream device is a cable modem, the client PC will have two IP addresses—one having been statically assigned to the cable modem, the other being assigned to the analog modem. Immediately after the client initiates a connection with the headend server via the POTS server, the client will be sent a "MAC-request" packet requesting IP and MAC address information. In response, the client will send a "MAC-reply" packet which will contain the client's IP and MAC address information. The POTS server will forward this information to the headend server, which will update its ARP table. Thereafter, when the client requests data from the headend server, the headend server will respond to the request by looking up the MAC address to which to send the requested data. However, as the lookup will be done by using the IP address of the ANALOG modem (i.e., the client PC's upstream device), the MAC address returned will be the MAC address of the analog modem. The headend server will thus select the analog modem instead of the cable modem as the receiving device, thereby undesirably transmitting downstream data to the analog modem, which is the slower connection.

Therefore, a solution needs to be provided for the above-identified situation where a client PC has two IP addresses for separate upstream and downstream devices and the transmission upstream and downstream data needs to be strictly segregated to each device.

SUMMARY OF THE INVENTION

To force the server to send all downstream data to the client using the downstream device, the following sequence would take place: (1) establish a connection between the server and the client using the upstream device; (2) construct a start-up packet in the client, the start-up packet containing the network address of the upstream device and the hardware address of the downstream device; (3) transfer the start-up packet from the client to the server using a predetermined port; and, (3) add an entry into the server memory in response to the start-up packet.

To remove the entry of the client from the server memory, the following sequence would be followed: (1) construct a shut-down packet in the client, the shut-down packet containing the network address of the upstream device; (2) transfer the shut-down packet from the client to the server using the predetermined port; and, (3) delete the entry from the data structure in response to the shut-down packet.

This invention solves the problem encountered by using separate upstream and downstream devices, which is that a client will support multiple IP addresses, all of which are unique, but the client requires that the headend server use only a set of MAC addresses for transmitting data to the client. The set of MAC addresses to be used is the set of MAC addresses of the downstream devices, to ensure that downstream data is sent to appropriate downstream devices.

The invention allows the headend server to relate the IP addresses of the client's upstream devices to one or more MAC addresses of the client's downstream devices by having the client "self-register" itself in the ARP table of the headend server.

Other features and advantages of the invention will be apparent from the accompanying drawings, and from the detailed description that follows below.

BRIEF DESCRIPTION OF THE DRAWINGS

FIG. 3 is a diagram of a data packet configured in accordance with the preferred embodiment of the present invention.

FIG. 4 is a diagram of another data packet configured in accordance with the preferred embodiment of the present invention.

DESCRIPTION OF THE INVENTION

The present invention provides a method and apparatus for providing address resolution information for self registration of clients on power-up or dial-in. For purposes of explanation, specific embodiments are set forth to provide a thorough understanding of the present invention. However, it will be understood by one skilled in the art, from reading this disclosure, that the invention may be practiced without these details. Further, although the present invention is described through the use of a one—way asymmetric cable modem network, most, if not all, aspects of the invention apply to all asymmetric networks in general. Moreover, well-known elements, devices, process steps and the like are not set forth in detail in order to avoid obscuring the present invention.

In a preferred embodiment of the present invention, the client, upon power-up and after establishing a connection with the headend server via the POTS server, will send a "start-up" packet to a special port on the headend server on which a server daemon is executing. The server daemon will take the information for the IP-MAC address translation from this start-up packet and insert a manual entry in the ARP table of the headend server. When the client wishes to end the session, the client will send a "shut-down" packet to the server daemon, again using the special port.

In another embodiment, after the client has established a connection and received an IP address, but BEFORE the headend server sends a MAC-request packet to request the client's for IP and MAC address information, the client will generate a MAC-reply packet and send this packet to the headend server. Thus, the client proactively generates a "reply" with the information without being queried and thereby registers itself. To ensure that the client's entry in the ARP table of the headend server does not become deleted—as the "MAC-reply" packet will create only a dynamic, and therefore, temporary, entry in the ARP table of the headend server—the client will resend the generated packet at predetermined intervals. The intervals will be shorter than the "time-out" period of the headend server for entries in its ARP table.

Thus, the invention would be used in a system having: (1) a server, the server including a server processor; and, server memory connected to the server processor for storing a set of network addresses and a set of MAC (hardware) addresses; and, (2) a client, the client including a client processor; an upstream device connected to the client processor, the upstream device for sending and receiving data from the server; a downstream device connected to the client processor, the downstream device for receiving data from the server; and, client memory connected to the client processor.

Figure 1:
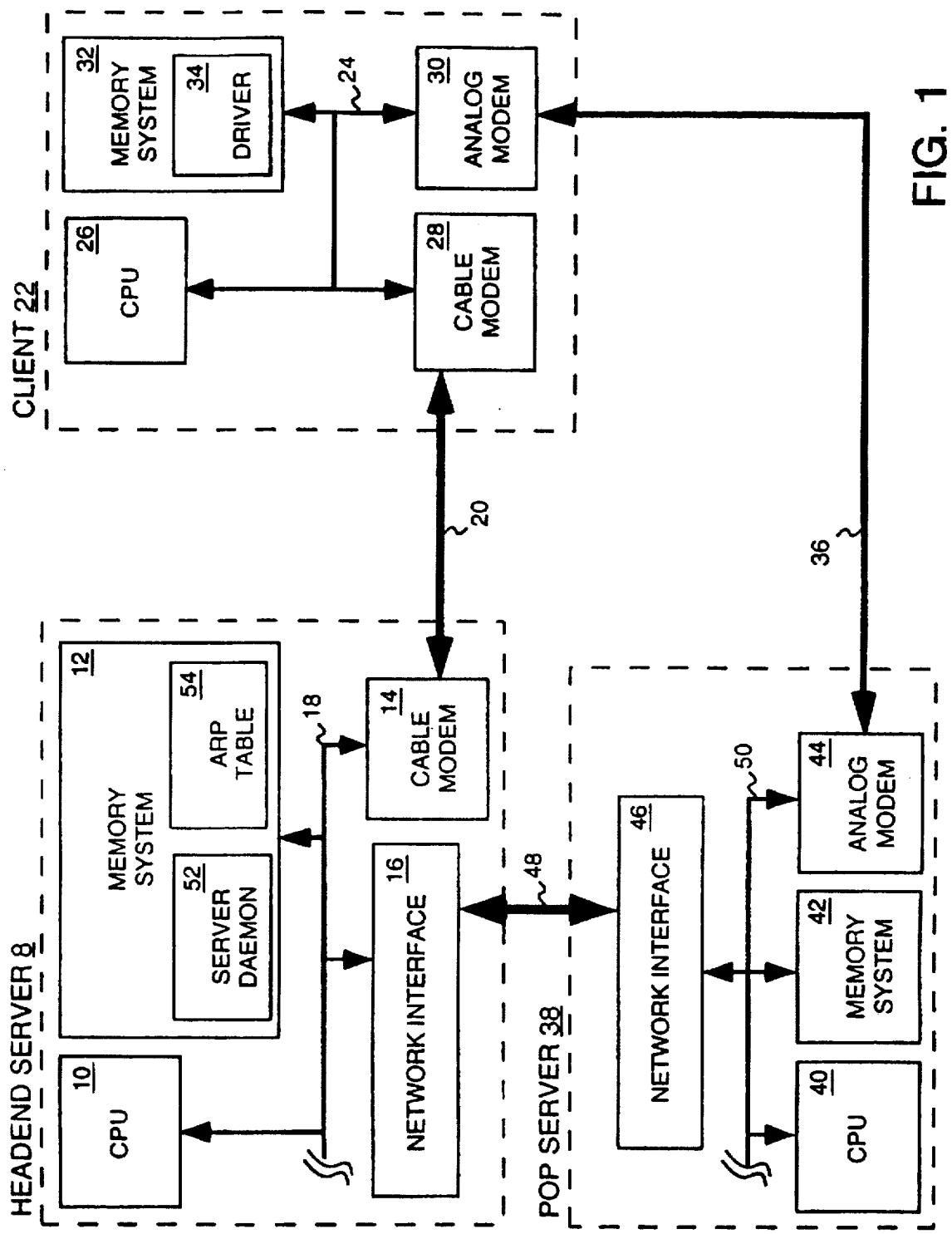
FIG. 1 is a block diagram of a computer network configured in accordance with a preferred embodiment of the present invention.

FIG. 1 is a block diagram of a system configured in accordance with a preferred embodiment of the present invention. In FIG. 1, headend server 8 has a CPU 10, a memory system 12, a cable modem 14 and a network interface 16 communicating with each other over bus 18. Headend server 8 provides high-speed data services and can offer access to the internet and proprietary networks through the use of special interfaces (not shown).

Also in FIG. 1 is a client 22 which includes a bus 24 to which a CPU 26, a cable modem 28 and an analog modem 30 are connected. A memory system 32 is also connected to bus 22. Memory system 32 may be random access memory or a combination of random access memory and disk memory. Memory system 32 has a client daemon 34 stored in it which cooperate with CPU 24 to provide the desired results. Client 22 is coupled to and communicates with headend server 8 through the use of cable 20.

Headend server 8 communicates with client 22 using a communication protocol such as the Transmission Control Protocol/Internet Protocol (TCP/IP). This protocol allows the performance of a large number of functions including packetizing data by attaching a header and footer to a block of data to be transmitted over a network and setting up a two-way connection between headend server 8 and client 22. Thus, client 22 is configured as an ordinary TCP/IP network machine.

Continuing with FIG. 1, a POTS server 38 includes a CPU 40 coupled to a memory system 42, an analog modem 44 and a network interface 46 through the use of a bus 50. POTS server 38 is connected to client 22 through the use of analog modem 30 and a telephone line 36. POTS server 38 receives data from client 22 using analog modem 44, which is then transmitted to headend server 8 over network 48 through the use of network interface 46.

In operation, data packets are assembled by headend server 8 and sent to cable modem 14, which transmits the data packets to client 22 on cable 20. Cable modem 14 includes an ethernet adapter which supports the ethernet standard as defined by the Institute of Electrical and Electronics Engineers (IEEE) 802.3. In addition, cable modem 14 is responsible for transmitting ethernet packets over cable 20. Some packets are intended to be received by all clients while other packets are targeted for one or more specific clients.

In the preferred embodiment, cable modem 28 is installed as an internal card which interfaces to bus 24 of client 22. For example, bus 24 can be a bus which conforms to the Peripheral Component Interconnect (PCI) standard and cable modem 28 can be contained on a card which would interface with PCI busses. Similar to cable modem 14, cable modem 28 includes an ethernet adapter which supports the ethernet standard as defined by IEEE 802.3. Cable modem 28 is also responsible for transmitting the ethernet packets from client 22 to headend server 8 over cable 20.

Thus, after the initial configuration and initialization of cable modem 14, downstream data would come to client 22 from headend server 8 over cable 20. However, in order for client 22 to send data back to headend server 8, a user would need to manually dial-up POTS server 38. Once the connection is established, the TCP/IP stack contained on client 22 becomes multi-homed (i.e. client 22 would have two IP addresses—one for analog modem 30 and one for cable modem 28), and any data that need to go upstream (i.e. to headend server 8) would go over telephone line 36 while any data that needs to come downstream is still transmitted over cable 20.

Driver 34 is specific to cable modem 26 and analog modem 30. Its function is to initialize, configure and control cable modem 26 and analog modem 30 and is loaded at system boot time. In alternate embodiments, the functions of driver 34 can be implemented by more than one module. Driver 34 also provides the necessary interface to the TCP/IP network and the ethernet protocol.

When a packet is received by client 22 using cable modem 28, it is passed on to driver 34. Driver 34 in turn stores the packet in memory system 32 and transfers it onto the TCP/IP stack. In the TCP/IP stack, the packet is checked for errors, stripped of its header and footer and passed on to an application program existing in memory system 32.

In the case of data to be passed from client 22 to headend server 8, the data originates in the application program and is passed down to the TCP/IP stack. At this stage the data is packetized and sent using driver 34 and analog modem 30 (i.e., the upstream device), over telephone line 36. POTS server 38 thus sends the packet to headend server 8 over network 48 using network interface 46 and network interface 16.

Figure 2:
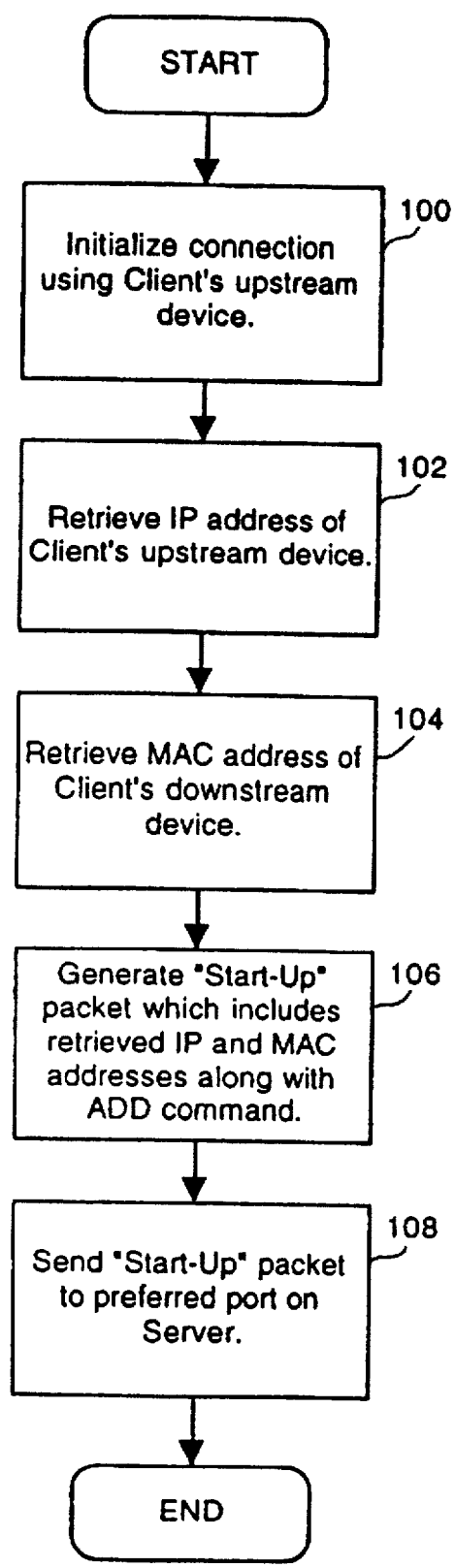
FIG. 2 is a flow diagram of the operation of a driver program of a client in the computer network in accordance with the preferred embodiment of the present invention for initiating a connection with a server in the computer network.

FIG. 2 illustrates a flow diagram of the operation of client 22 in accordance with the preferred embodiment of the present invention.

In block 100, client 22 has been powered-up and has loaded driver 34 and all other necessary software into memory system 32. Thereafter, a user initializes a connection to headend server 8 using the upstream device of client 22 (i.e., analog modem 30). Analog modem 30 communicates with POTS server 38 over telephone line 36 through the use of analog modem 44, which is contained in POTS server 38. POTS server 38 will assign analog modem 30 an IP address using a protocol such as the Dynamic Host Configuration Protocol (DHCP). In an alternate embodiment, analog modem 30 could receive a static IP address in a similar fashion to cable modem 28. At this point, no data other than handshaking, user log-in information (e.g., password and user id) and IP address assignment have been exchanged.

In block 102, driver 34 of client 22 retrieves the IP address of analog modem 30. This IP number will be the IP address that will be used by headend server 8 to communicate with client 22.

In block 104, driver 34 retrieves the MAC address of the downstream device of client 22 (i.e., cable modem 28). This MAC address will be the ethernet address which will be used by headend server 8 to send downstream data to client 22.

In block 106, driver 34 will generate a "start-up" packet which includes: (1) the IP address retrieved in block 102; (2) the MAC address retrieved in block 104; and (3) an ADD command. The ADD command is used by a client to signal server daemon 52 of headend server 8 to add a manual, static, entry into the ARP table of headend server 8 so that anytime headend server 8 communicates with client 22, the MAC address retrieved by headend server 8 from doing an ARP table looked-up using the IP address of client 22 will return the MAC address of cable modem 28. As described in the discussion of FIG. 3 and FIG. 4, below, in the preferred embodiment, the packet is constructed using the User Datagram Protocol (UDP) and is sent to a known good port on headend server 8. Specifically, the packet is transmitted to the known good port on POTS server 38 which then forwards the packet to headend server 8, also on the known good port. In the preferred embodiment, this port is port number 473.

It is to be noted that although cable modem 28 also has an IP address, this IP address is not used. Therefore, only the IP address of analog modem 30 (the upstream device of client 22) and the MAC address of cable modem 28 (the downstream device of client 22) will be used.

In block 108, client 22 will send the start-up packet to POTS server 38 over telephone line 36. POTS server 38 will then forward the start-up packet to headend server 8 over network 48.

FIG. 3 and FIG. 4 contain diagrams of a start-up packet 112 and a shut-down packet 114, respectively, configured in accordance with the preferred embodiment of the present invention.

As discussed above, start-up packet 112 and shut-down packet 114 are UDP packets. Start-up packet 112 and shut-down packet 114 each contains the following fields: a destination MAC address; a source MAC address; a destination IP address; a source IP address; a destination port; a source port; and a packet data.

The destination MAC and IP addresses are the MAC and IP addresses of POTS server 38, respectively. In FIG. 3 and FIG. 4, for sake of simplicity, the destination MAC address of POTS server 38 is a broadcast ethernet address FF-FF-FF-FF-FF-FF while the destination IP address of POTS server 38 is a broadcast IP address 256.256.256.256.

The source MAC and IP addresses are the MAC and IP addresses of analog modem 30, respectively. In FIG. 3 and FIG. 4, the source MAC address of analog modem 30 is 00-AA-00-11-22-33 while the source IP address of analog modem 30 is 143.182.12.17.

The destination port field contains the hexadecimal equivalent of decimal number 473, which, as discussed above, is the known good port used in the preferred embodiment of the present invention. In the preferred embodiment, the source port field is not important as only the destination port field is monitored.

The packet data field contains what is used to alter ARP table 54 of headend server 8. For start-up packet 112, in the preferred embodiment, the packet data field would contain: (1) 41, which represents an ADD command; (2) 143.182.12.17, which is the IP address of analog modem 30, the upstream device; and (3) 00-AA-00-33-44-55, which represents the MAC address of cable modem 28, the downstream device. The ADD command will add an entry in ARP table 54 containing the IP address of analog modem 30 (i.e., 143.182.12.17) and the MAC address of cable modem 28 (i.e., 00-AA-00-33-44-55).

In FIG. 4, for shut-down packet 114, all fields of packet 112 remain the same except for the packet data field, which would include: (1) 42, which represents a DELETE command; and (2) 143.182.12.17, which represents the IP address of analog modem 30, the IP address for the entry to be deleted from ARP table 54 of headend server 8. In the preferred embodiment, to delete the entry containing the IP address of analog modem 30 and MAC address of cable modem 28 from ARP table 54, only the IP address of analog modem 30 is needed.

Figure 5:
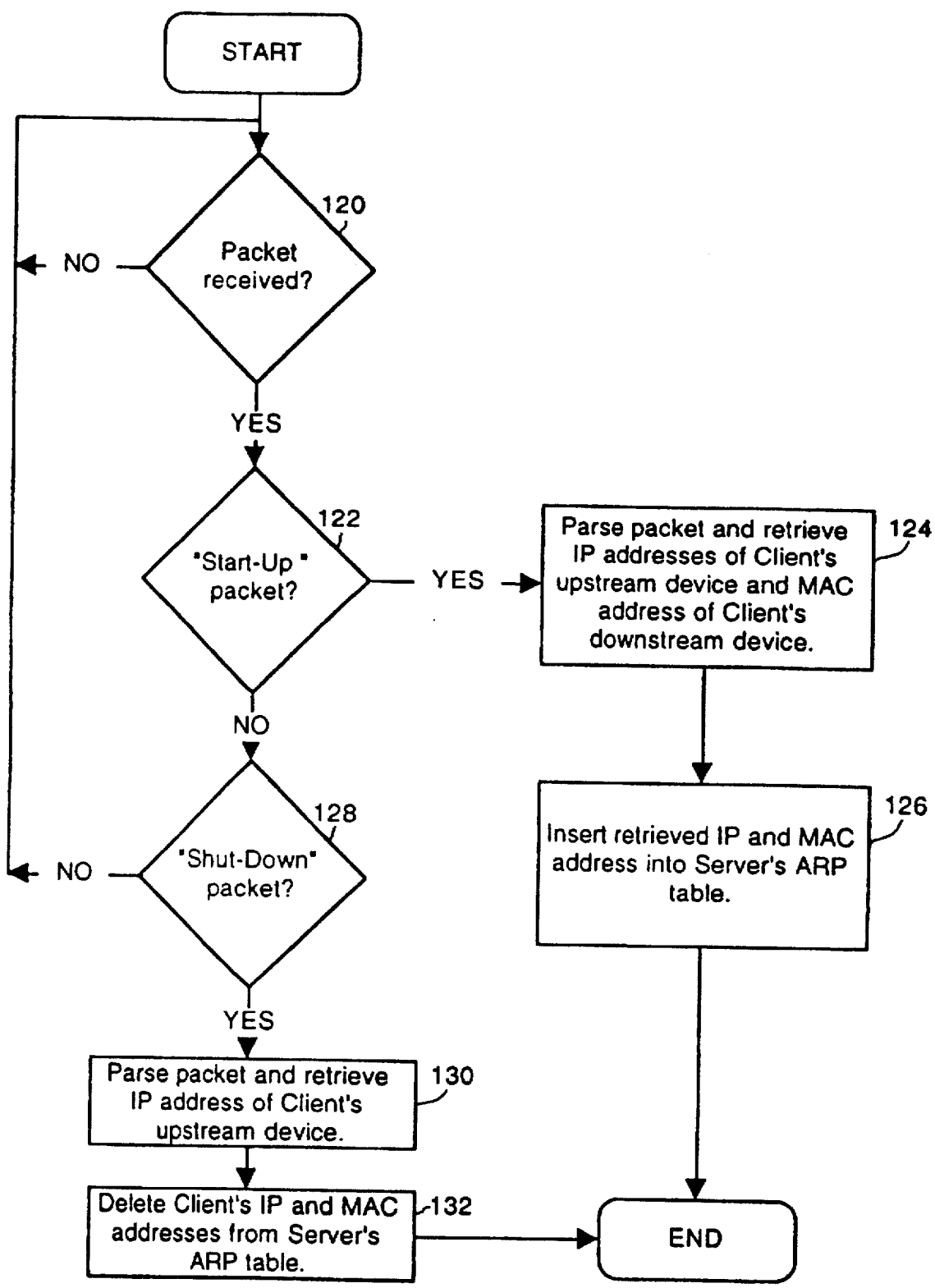
FIG. 5 is a flow diagram of the operation of a server daemon of a server in the computers network in accordance with the preferred embodiment of the present invention.

In the preferred embodiment, the data structures for start-up packet 112 and shut-down packet 114 can be implemented in a programming language such as "C". For example, the typedef for start-up packet 112 would be:

typedef server start-up {
  Char Packet_type;
  Char IP_address[4];
  Char MAC_address[6];
} START_UP In addition, the typedef for shut-down packet 114 would be:

typedef server shut_down {
  Char Packet_type;
  Char IP_address[4];
} SHUT_DOWN FIG. 5 is a flow diagram illustrating the preferred operation of server daemon 52 of headend server 8.

In block 120, server daemon 52 will idle until it receives a packet on the known good port. As discussed in FIG. 2, in the preferred embodiment, the known good port is port number 473. Therefore, server daemon 52 will only respond to packets coming in on that port. Once a packet has been received by server daemon 52 on the known good port, operation will continue with block 122. Otherwise, operation will repeat with block 120.

In block 122, headend server 8 has received a packet on the known good port and server daemon 52 will determine if the packet received is a "start-up" packet. If it is determined that the receipt packet is a start-up packet, then operation will continue with block 124. Otherwise, operation will continue with block 128. Server daemon 52 determines whether the received packet is a start-up or shut-down packet by examining the data portion/field of the packet to see whether it contains an ADD or DELETE command.

In block 124, the received packet is a start-up packet and, therefore, server daemon 52 will parse the packet and retrieve the IP address of analog modem 30 (the upstream device of client 22) and also retrieve the MAC address of cable modem 28 (the downstream device of client 22).

In block 126, server daemon 52 will insert the retrieved IP and MAC addresses of client 22 into the ARP table of headend server 8. In the preferred embodiment, server daemon 52 will execute a command that will add this entry into the ARP table. In an alternate embodiment, server daemon 52 can also invoke a call using a defined application program interface (API).

Returning to block 122, if server daemon 52 determines that the received packet is not a start-up packet, then operation will continue with block 128.

In block 128, server daemon 52 will determine if the received packet is a shut-down packet. If the received packet is not a shut-down packet then operation will return to block 120 where server daemon 52 will once again wait for a packet to arrive at the known good port. Otherwise, if the received packet is a shut-down packet, then operation will continue with block 130. The operation of block 130 and the remaining portion of FIG. 5 will be discussed below, after the discussion of FIG. 6.

Figure 6:
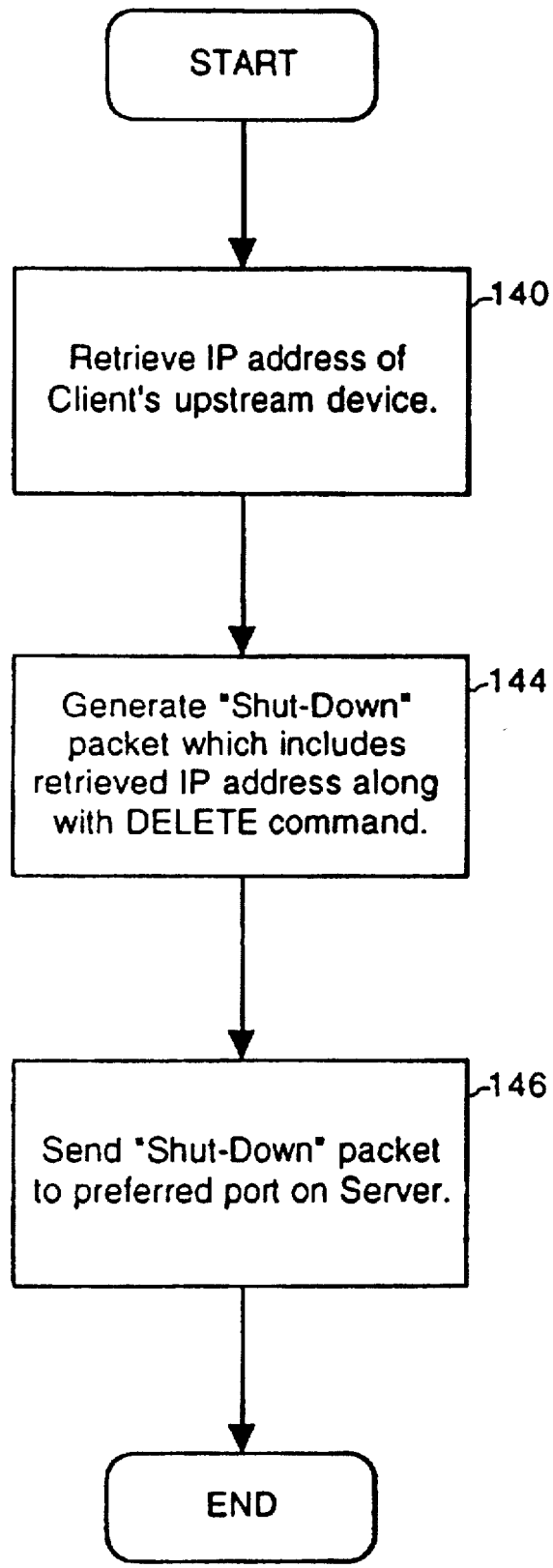
FIG. 6 is a flow diagram of the operation of the driver program of the client in the computer network in accordance with the preferred embodiment of the present invention for terminating a connection with the server.

FIG. 6 is a flow diagram of the operation of driver 34 of client 22 in accordance with the preferred embodiment of the present invention for terminating a connection with headend server 8. The sequence begins with block 140, where driver 34 retrieves the IP address of analog modem 30 (the upstream device of client 22). In an alternate embodiment, the IP address of analog modem 30 could have been stored after it was retrieved in block 102 of FIG. 2, thereby eliminating the need to re-obtain this IP number. Operation will then continue with block 144.

In block 144, driver 34 of client 22 will generate a "shut-down" packet which includes the retrieved IP address along with a "DELETE" command. This packet is also a UDP packet, thereby having the same format as the start-up packet described in FIG. 3. An example shut-down packet is as provided in FIG. 4.

In block 146, driver 34 will transmit the shut-down packet to POTS server 38 using telephone line 36, which will then re-transmit it to headend server 8 using network 48. The shut-down packet, like the start-up packet, will be sent to the known good port on headend server 8. As stated above, this known good port is port number 473.

Referring to back to block 130 of FIG. 5, where client 22 has sent a shut-down packet as described in block 146 of FIG. 6, server daemon 52 will parse the packet and retrieve the IP address of analog modem 30 (the upstream device of client 22). Operation will then continue with block 132 of FIG. 5.

In block 132, server daemon 52 will locate the entry of client 22 corresponding to the retrieved IP of client 22 in the ARP table of headend server 8. In the preferred embodiment, server daemon 52 will execute a command that will delete this entry in the ARP table. In an alternate embodiment, server daemon 52 can also invoke a call using a defined API.

Figure 7:
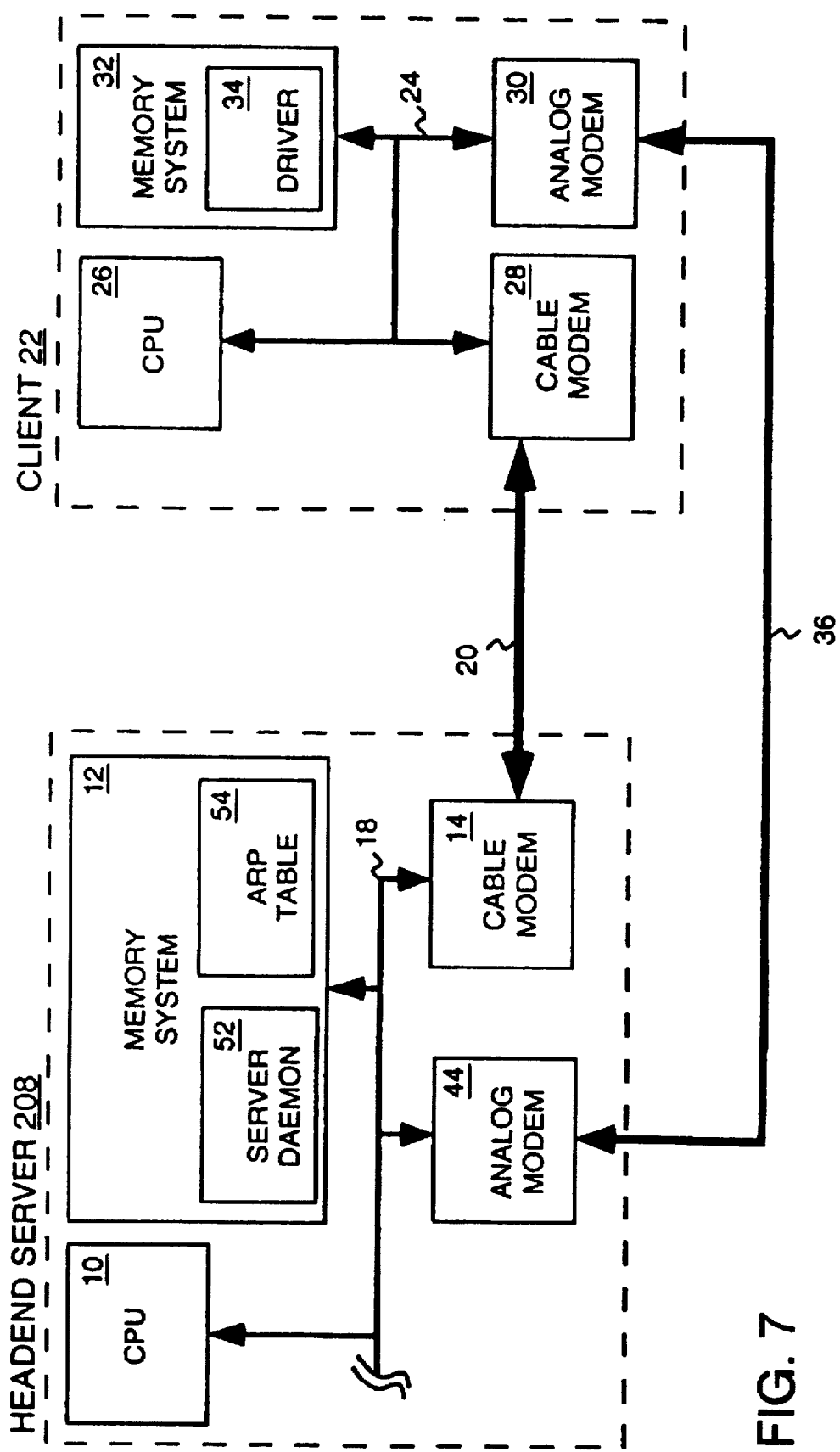
FIG. 7 is a block diagram of a computer network configured in accordance with an alternate embodiment of the present invention.

FIG. 7 is a block diagram of an alternate embodiment of the present invention, having a headend server 208 and client 22. In this alternate embodiment, certain elements from the preferred embodiment in FIG. 1 have been eliminated. Specifically, network interface 16, network 48, and all the elements of POTS server 38 except for analog modem 44 have been eliminated.

As can be seen in FIG. 7, analog modem 44 has been incorporated into headend server 208 by being coupled to bus 18. Thus, headend server 208 could incorporate the functions of POTS server 38, which would include services normally provided by Remote Access Services Servers. Therefore, headend server 208 would take over the duties of POTS server 38 and all upstream data would be sent to analog modem 44 by analog modem 30 of client 22 while all downstream data would still be sent from cable modem 14 of headend server 8 to cable modem 28 of client 22.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. In a network having a server and a client, said client having an upstream device which sends and receives data from said server and a downstream device which receives data from said server, and said server containing a set of network addresses and a set of hardware addresses, a method for forcing said server to send all downstream data to said client using said downstream device comprising the steps of:

establishing a connection between said server and said client using said upstream device;

constructing a start-up packet in said client;

transferring said start-up packet from said client to said server using said upstream device and a predetermined port; and, adding a set of addresses into said server memory in response to said start-up packet to configure said server to transfer all data for said client using said downstream device.

2. The method of claim 1, wherein said start-up packet contains a data field, and said start-up packet constructing step comprises the steps of:

determining a network address of said upstream device of said client;

determining a hardware address of said downstream device of said client; and, placing said network address and said hardware address into said data field along with an ADD command.

3. The method of claim 1, wherein said adding step comprises the steps of:

extracting a network address of said upstream device of said client;

extracting a hardware address of said downstream device of said client; and, executing a command to insert said network address and said hardware address into said server memory.

4. The method of claim 3, wherein said command is an application programming interface command.

5. The method of claim 1, further comprising the steps of:

constructing a shut-down packet in said client;

transferring said shut-down packet from said client to said server using said predetermined port; and, deleting said set of addresses from said data structure in response to said shut-down packet.

6. The method of claim 5, wherein said shut-down packet contains a data field, and said shut-down packet constructing step comprises the steps of:

determining a network address of said upstream device of said client;

placing said network address into said data field along with a DELETE command.

7. The method of claim 5, wherein said deleting step comprises the steps of:

extracting a network address of said upstream device of said client;

executing a command to delete said set of addresses from said server memory.

8. The method of claim 7, wherein said command is an application programming interface command.

9. A system comprising:

a server including:
  a server processor; and,
  server memory coupled to said server processor for storing a set of network addresses and a set of hardware addresses; and, a client including:
  a client processor;
  an upstream device coupled to said client processor, said upstream device for sending and receiving data from said server;
  a downstream device coupled to said client processor, said downstream device for receiving data from said server; and,
  client memory coupled to said client processor;

wherein said client memory is configured to enable said client processor to:
  establish a connection between said server and said client using said upstream device;
  construct a start-up packet in said client; and, transfer said start-up packet from said client to said server using said upstream device and a predetermined port;

wherein said server memory is configured to allow said server processor to add a set of addresses into said server memory in response to said start-up packet to configure said server to transfer all data for said client using said downstream device.

10. The system of claim 9, wherein said start-up packet contains a data field, and said client memory is further configured to enable said client processor to:

determine a network address of said upstream device of said client;

determine a hardware address of said downstream device of said client; and, place said network address and said hardware address into said data field along with an ADD command.

11. The system of claim 9, wherein said server memory is further configured to allow said server processor to:

extract a network address of said upstream device of said client;

extract a hardware address of said downstream device of said client; and, executing a command to insert said network address and said hardware address into said server memory.

12. The system of claim 11, wherein said command is an application programming interface command.

13. The system of claim 9, wherein:

said client memory is further configured to allow said client processor to:

construct a shut-down packet in said client; and, transfer said shut-down packet from said client to said server using said special port; and, said server memory is configured to allow said server processor to:

delete said set of addresses from said server memory in response to said shut-down packet.

14. The system of claim 13, wherein said shut-down packet contains a data field, said client memory is further configured to allow said client processor to:

determine a network address of said upstream device of said client;

place said network address into said data field along with a DELETE command.

15. The system of claim 13, wherein said server memory is further configured to allow said server processor to:

extract a network address of said upstream device of said client;

execute a command to delete said set of addresses from said server memory.

16. The system of claim 15, wherein said command is an application programming interface command.

* * * * *

UNITED STATES PATENT AND TRADEMARK OFFICE
CERTIFICATE OF CORRECTION

PATENT NO. : 5,894,479 Page 1 of 1
DATED : April 13, 1999
INVENTOR(S) : Mohammed It is certified that error appears in the above-identified patent and that said Letters Patent is hereby corrected as shown below:

Column 8,
Line 65, delete "POTS.server" and insert -- POTS server --.

Signed and Sealed this

Second Day of December, 2003

JAMES E. ROGAN
*Director of the United States Patent and Trademark Office*